Nov. 13, 1951
A. H. GENTER
2,574,735
CUTTER BIT FOR MINING MACHINES
Filed Jan. 30, 1948
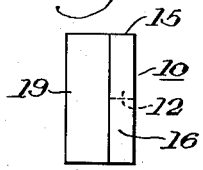
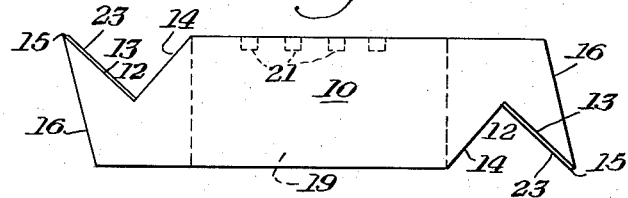
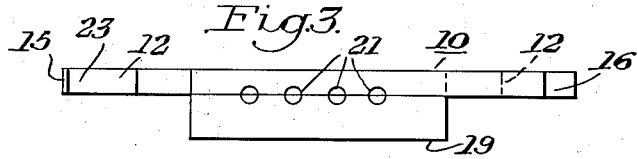
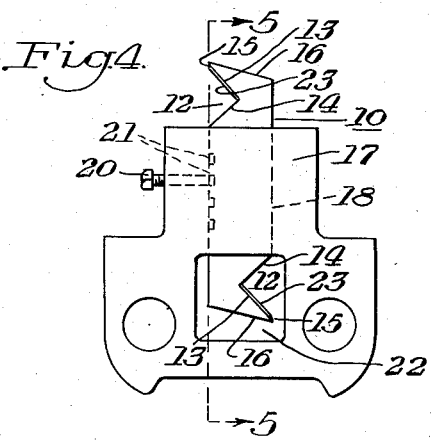
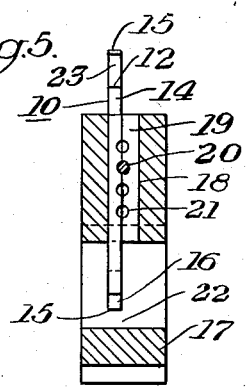
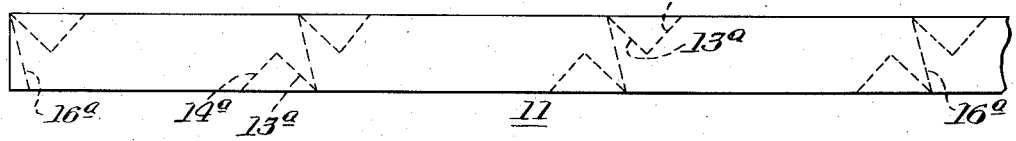
INVENTOR.
Albert H. Genter.
BY Patented Nov. 13, 1951

2,574,735

UNITED STATES PATENT OFFICE 2,574,735

CUTTER BIT FOR MINING MACHINES

Albert H. Genter, Mount Lebanon, Pa.

Application January 30, 1948, Serial No. 5,458

1 Claim. (Cl. 262—33)

Among the objects in view are the following.

The provision of a cutter bit that may be quickly and economically formed by shearing a plurality of bit blanks from a length of flat steel, with oppositely backed off end edges, and forming cutting edges at the ends of the bit by milling or stamping relatively deep angular notches in the longitudinal edges of each blank, the outer wall of each notch merging with the adjacent end edge of the blank to form a cutting edge.

The said wall of the notch is provided with a wear-resisting surface produced by coating the same with a layer of a suitable hard, wear-resisting material, such as tungsten carbide flakes welded in place. Thus as an end of the bit is worn down in use, owing to the presence of this wear-resisting layer, an efficient cutting edge is maintained until the end edge is reduced practically to the apex of the adjacent notch. Then the bit is removed from the chain block and reversed to present it for further cutting use.

I form the notches at the opposite ends of the bit in the opposite longitudinal edges of the blank and back-off the ends of the blanks in parallel lines, thus reducing the labor and time required in severing the blanks from a bar of flat steel, owing to the fact that the bar may be moved forwardly in the cutting mechanism in severing the successive blanks without turning over the bar between cuts.

The bit having the same rectangular cross section throughout its length, except at the notched portion, may readily be advanced longitudinally in the chain block, as a cutting edge wears down in use, to maintain it in proper engagement with the coal seam and its proper alignment with adjacent bits.

An important object of my invention is the provision of a "throw-away" cutter bit, having a cutting edge at each end thereof, which may be worn out without its removal from the mining machine for resharpening, but may be kept in continuous use until worn out. This effects a very material economy compared to the cutting bits now in general use which require expensive resharpening many times before they are discarded.

The provision of the welded layer of hard wear-resisting material on the outer inclined walls of the notches maintains a sharp cutting edge until the cutting point of the bit is worn to substantially the apex or bottom of the notch.

The layer of hard wear-resisting material above referred to may be omitted but its provision has the important effect of prolonging the effective life of the bit.

Other advantages and novel features of the invention will appear from the following description.

In the accompanying drawings, which illustrate a practical embodiment of the principles of the present invention, Fig. 1 is a side elevation of the bit with a filler strip in position against the reverse side of the bit;

Fig. 2 is an end view looking from the left in Fig. 1;

Fig. 3 is a longitudinal edge view of the bit and filler;

Fig. 4 is a side elevation of a chain block in which one of the improved bits is mounted;

Fig. 5 is a transverse vertical section taken along the dotted line IV—IV in Fig. 4 showing the bit and the filler strip mounted in place for use; and Fig. 6 is a side elevation of a strip of bar stock on which is indicated in dotted lines how the strip is cut to form the individual bits.

Referring to the drawings, 10 indicates one of the improved cuter bits which consists of a suitable length of tool steel bar stock, as of silicon steel, of uniform width and thickness. Preferably the overall length of the bit is four inches, its width one inch and its thickness three-sixteenths of an inch, the same being the width and the thickness of the bar stock 11, illustrated in Fig. 6, from which the individual bits are cut.

Adjacent either end of the bit 10, formed as by punching or milling, in the opposite lateral edges thereof are provided two triangular notches 12 formed by the intersecting walls 13 and 14; the outer wall 13 of the notches merging at its outer end with the end edge of the bit to form the cutting edge 15, while the other wall 14 of the notches extends to the lateral edge of the bit. The angle between the intersecting walls 13 and 14 of the notches is illustrated as that of about ninety degrees, which is suitable to prevent clogging.

To provide clearance for the cutting edges 15 and to reduce the load on the driving mechanism of the mining machine, the end edges 16 of the bit are "backed-off" or inclined inwardly from the cutting edge 15 to the opposite lateral edge of the bit at an angle less than that of the wall 13 of the notch 12, preferably at about fifteen degrees to a line at right angles to the longitudinal edge of the bit. Thus the area of cutting contact between the coal seam and the cutter bit is confined to the cutting edge, thereby lessening the friction and drag exerted on the chain during cutting operation.

17 indicates one of the cutter chain blocks, the same being illustrated as a form in common use in the coal mining industry. It is understood that the blocks are pivotally connected together to form the cutter chain and are each provided with a bore or throat 18 in which the cutter bit is fixed and from which it protrudes to travel in cutting contact with the coal seam while the cutter chain is in motion.

The throat of the chain block illustrated in the drawing is of rectangular cross-section and is disposed at right angles to the path of travel of the chain. The improved cutter bit is of such dimension or width as to slidably fit the throat in the plane of travel of the block but of such less thickness as to require a filler strip 19 to occupy the extra width of the throat. Thus, in the drawings, the throat 18 of the block 17 is assumed to be one inch in dimension in the direction of the movement of the chain and one-half inch in cross dimension, so that to fill out the throat where a bit of three-sixteenths of an inch in thickness is used a filler 20 in the form of a strip of steel of the same width as that of the bit but five-sixteenths of an inch in thickness is provided, and the bit and filler strip are detachably fixed in the throat of the chain block as by the set screw 21.

It is obvious that the throat of the chain block may be of such cross-sectional dimensions as to fit the bit without requiring a filler block.

To prevent accidental displacement of the bit relative to the throat of the chain block, the adjoining longitudinal edges of the bit and spacer may be provided with arcuate depressions which cooperate to form circular depressions in which the inner end of the screw 20 seats, but the preferable method of holding the bit and spacer in position is to provide the set screw with a cutting edge which will bite into the steel and thus permit closer and more accurate adjustment of the bit in the chain block.

In the type of chain block illustrated in the drawings, at its inner end the throat 18 merges into a clearance opening 22 extending transversely of the block and open at the sides.

The reference numeral 23 indicates a facing of hard wear-resisting material, such, for instance, a layer of tungsten carbide flakes welded in place, applied to the faces of the walls 13 of the notches 12 at the ends of the bit. Thus, as the coal-engaging portion of the bit is gradually worn away, the wear will be effective on the end edge 16 of the bit and will be resisted by the facing 23. Thus the cutting edge 15 will be maintained in good cutting condition until it retreats practically to the apex or bottom of the notch 12.

As the cutting edge 15 at one end of the bit is gradually worn down by continued traveling contact with the coal seam, the bit may be adjusted by moving it outwardly in the throat 18 to the proper extent, and then retightening the set screw. Such adjustment may be repeated until the cutting edge is worn down nearly to the apex of the notch 12; whereupon the bit is reversed in the throat and its unworn cutting edge at the opposite end of the bit is presented in cutting position.

When the second cutting edge 15 is worn down until its effectiveness is destroyed, the bit is removed from the machine and scrapped.

The provision of cutting bits of relative small thickness results in a narrow cut being formed, requiring the use of less power to operate the cutting chain of the machine. Furthermore the cost of the bits is reduced as less steel is required for the individual bits.

The bits may be inexpensively manufactured by being cut from a bar of tool steel of a total length sufficient for the production of a plurality of bits. Thus in Fig. 6, 11 indicates a bar of tool steel which is severed into lengths along the dotted parallel lines 16a to separate the bar 11 into a plurality of blanks each having its ends oppositely backed-off, and is also punched, milled or cut along the dotted lines 13a and 14a to form the notches 12 and cutting edges 15.

The uniform width and thickness of the material of the bits enable them to be cut from rolled bars of suitable steel without additional operations except that of punching or milling the notches to form the cutting edges. Thus the cost of manufacturing the improved bits is much less than that of manufacturing bits of varying cross-sectional dimensions throughout their length, and therefore it is possible to use the improved bits in the "throw-away" method with economy.

Again the location of the two cutting edges 15 at opposite sides of each bit enables the cuts indicated at 16a in Fig. 6 to be parallel throughout the length of the stock during the cutting operation, and therefore the stock does not require to be turned over in the machine between successive cuts throughout its length.

My improved bit may be used until both cutting extremities are worn out without requiring resharpening by heating, forging or hammering. Thus a very material economy is effected since the bits now in common use require removal from the cutting chain a great many times for resharpening, even as many as forty or fifty times, causing a very material loss by stoppage of the operation of the cutter machine, and also costs of the resharpening operations.

The ability of shifting the bits longitudinally in the throats of the chain blocks has the advantage of maintaining the cutting edges properly projected from the chain for effective engagement with the coal seam.

Again, my improved cutting bit may be mounted in any of the standard chain blocks in proper position without the use of wedges. Thus the necessary filler blocks may be cut to proper lengths and with squared ends from a stock bar of rectangular cross-sectional shape, thereby reducing the cost of the fillers.

Other advantages will be clear to those experienced in the coal mining art.

I claim:

A coal cutting bit designed for mounting in the chain blocks of a coal cutting machine the blocks of which are provided, to receive the bit, with throats disposed at substantially right angles to the face of the coal seam to be cut, said bit being formed of a steel bar of rectangular cross-sectional shape, and said bit being provided adjacent each of its ends but at opposite longitudinal edges of the bar with a triangular reentrant notch extending inwardly to approximately the longitudinal axis of the bit, the two defining walls of each notch diverging outwardly and the outer defining wall of the notch merging at an acute angle at its outward end with the end of the adjacent end wall of the bit to form a cutting edge, said end wall of the bit extending from the cutting edge, being backed off or inclined toward the longitudinal center of the bit to lessen the drag during the cutting operation.

ALBERT H. GENTER.

REFERENCES CITED

The following references are of record in the file of this patent:

UNITED STATES PATENTS

| Number | Name | Date |
|---|---|---|
| 1,435,309 | Kenton | Nov. 14, 1922 |
| 1,995,234 | Wenzlick | Mar. 19, 1935 |
| 1,995,235 | Wenzlick | Mar. 19, 1935 |
| 2,107,942 | Holmes | Feb. 8, 1938 |
| 2,156,725 | Fulke | May 2, 1939 |
| 2,296,235 | Fulke | Sept. 15, 1942 |
| 2,322,929 | Fulke | June 29, 1943 |
| 2,337,322 | Gascoigne | Dec. 21, 1943 |